United States Patent
Ishikawa et al.

(10) Patent No.: US 11,961,727 B2
(45) Date of Patent: Apr. 16, 2024

(54) MASS SPECTROMETER AND PROGRAM FOR MASS SPECTROMETER

(71) Applicant: SHIMADZU CORPORATION, Kyoto (JP)

(72) Inventors: Yuki Ishikawa, Kyoto (JP); Yusuke Tagawa, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 380 days.

(21) Appl. No.: 17/609,672

(22) PCT Filed: Aug. 7, 2019

(86) PCT No.: PCT/JP2019/031043
§ 371 (c)(1),
(2) Date: Nov. 8, 2021

(87) PCT Pub. No.: WO2021/024396
PCT Pub. Date: Feb. 11, 2021

(65) Prior Publication Data
US 2022/0238318 A1    Jul. 28, 2022

(51) Int. Cl.
*H01J 49/00*    (2006.01)
*H01J 49/16*    (2006.01)

(52) U.S. Cl.
CPC ........ *H01J 49/0036* (2013.01); *H01J 49/165* (2013.01)

(58) Field of Classification Search
CPC ............................ H01J 49/0036; H01J 49/165
See application file for complete search history.

(56) References Cited

U.S. PATENT DOCUMENTS 6,759,650 B2    7/2004  Covey et al.
7,098,452 B2    8/2006  Schneider et al.
(Continued)

FOREIGN PATENT DOCUMENTS

JP    2018-073360 A    5/2018
WO    2018/078693 A1    5/2018

OTHER PUBLICATIONS

"LabSolutions Connect MRM", Shimadzu Corporation, searched on Jul. 17, 2019, LabSolutions_ConnetMRM_|_Analytical_Measuring_Instruments_(Anayzers)_Shimadzu_Works_:_Shimadzu_Corporation, pp. 1-9.
(Continued)

*Primary Examiner* — Nicole M Ippolito
*Assistant Examiner* — Hanway Chang
(74) *Attorney, Agent, or Firm* — Sughrue Mion, PLLC

(57) ABSTRACT

A mass spectrometer according to one aspect of the present invention includes an ion source (31), a mass separator (32), and a detector (33), the mass spectrometer further including: a parameter optimization unit (531, 532, 533) configured to optimize a parameter value using a Bayesian optimization method based on a result obtained by making measurements while changing values of device parameters including a plurality of parameters that affects ionization efficiency in the ion source (31), a display processor (536) configured to display a sensitivity model which is a posterior distribution indicating a relationship between a plurality of parameters in all or some of the device parameters and signal strength estimated during the optimization of the device parameters, expressing as a graph like a heat map or an array of a plurality of the graphs on a display unit (7), and to sequentially update the sensitivity model, and a file creation unit (535) configured to a user to designate a position on the displayed graph, and to create a method file containing a (Continued)

measurement condition used for sample measurement, based on a combination of values of parameters corresponding to the designated position.

9 Claims, 8 Drawing Sheets

(56) References Cited

U.S. PATENT DOCUMENTS 8,039,795 B2    10/2011  Mordehai et al.
2019/0252178 A1  8/2019  Nishiguchi

OTHER PUBLICATIONS

Yusuke Tagawa, et al., "Interface Parameter Optimization for LC-MS Sensitivity Measurement", Shimadzu Review Editor, published on Mar. 20, 2019, Shimadzu Review, pp. 131-135, vol. 75, No. 3-4.
Kevin Swersky, et al., "Multi-Task Bayesian Optimization", searched on Jul. 18, 2019, NIPS, 2013, Multi-Task_Bayesian_Optimization_(neurips_cc), pp. 1-9.
Jasper Snoek, et al., "Practical Bayesian Optimization of Machine Learning Algorithms", searched on Jul. 18, 2019, NIPS, 2012, Practical_Bayesian_Optimization_of_Machine_Learning_Algorithms_(neurips.cc), pp. 1-9.
International Search Report for PCT/JP2019/031043 dated Oct. 10, 2019 [PCT/ISA/210].
Written Opinion for PCT/JP2019/031043 dated Oct. 10, 2019 [PCT/ISA/237].

PROBLEM SETTING

IF JUDGED BY PERSON

IF BAYESIAN OPTIMIZATION IS DONE

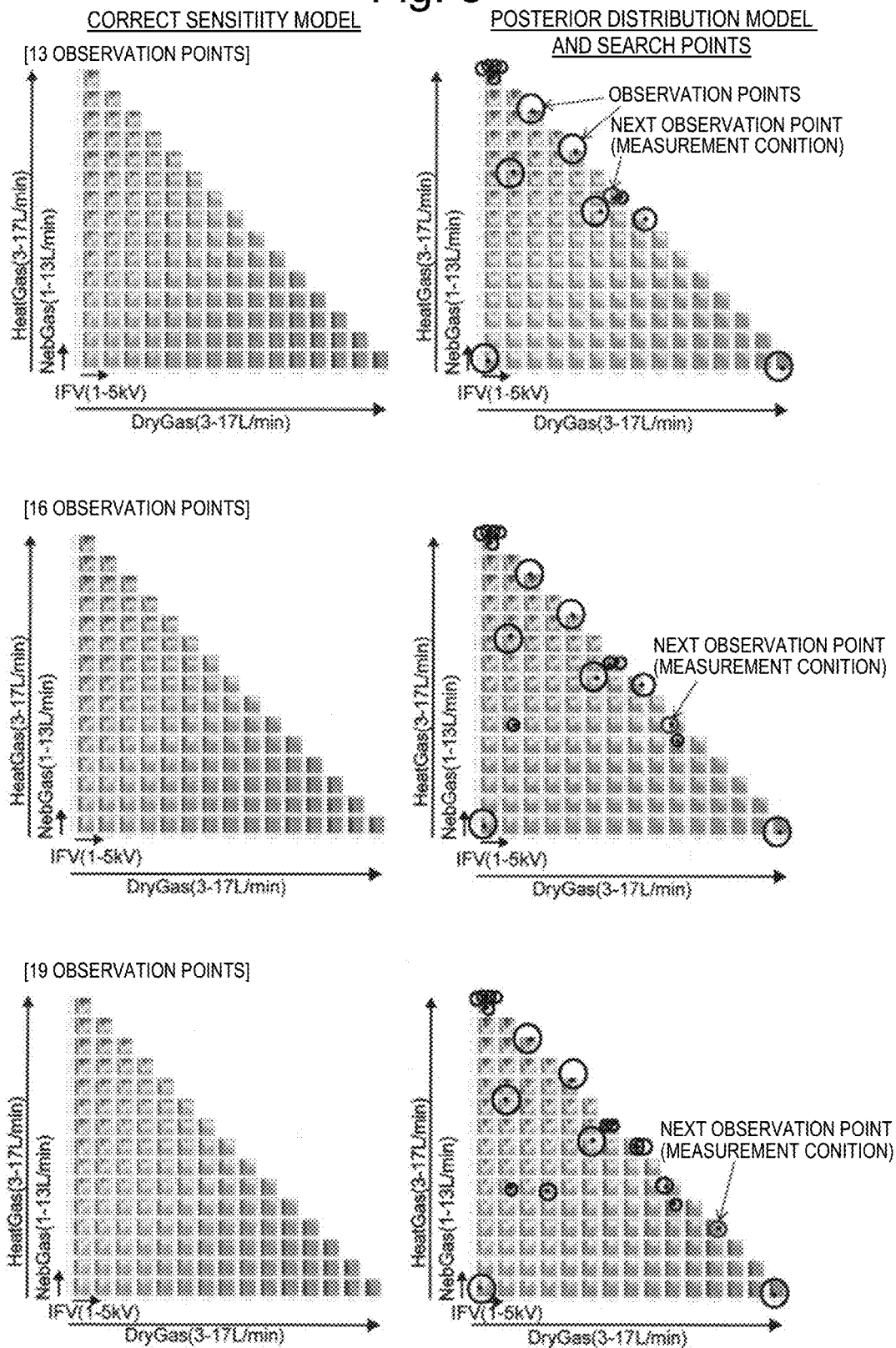

MASS SPECTROMETER AND PROGRAM FOR MASS SPECTROMETER

CROSS REFERENCE TO RELATED APPLICATIONS

This application is a National Stage of International Application No. PCT/JP2019/031043 filed Aug. 7, 2019.

TECHNICAL FIELD

The present invention relates to a mass spectrometer and a computer program for the mass spectrometer, and more specifically relates to the mass spectrometer having a function of adjusting device parameters to an optimal state or an approximately optimal state based on an actual measurement result, and the computer program for the mass spectrometer.

BACKGROUND ART

The liquid chromatograph mass spectrometer (LC-MS) uses an ion source in order to ionize a compound in a sample liquid eluted from a column of a liquid chromatograph unit. Such an ion source is obtained by an atmospheric pressure ionization (API) method such as an electrospray ionization (ESI) method, an atmospheric pressure chemical ionization (APCI) method, or an atmospheric pressure photoionization (APPI) method. For example, in an ESI ion source, when a high voltage on the order of kV is applied to the vicinity of a distal end of a capillary to which an eluate from a column is supplied, the eluate is nebulized into an ionization chamber having an approximately atmospheric pressure while a biased electric charge is being applied to the eluate. Minute charged droplets thus generated are exposed to a high-temperature gas in the ionization chamber, and vaporization of solvents (mobile phases) in the droplets is promoted. In the process of vaporization of the solvents and splitting of the droplets, sample components in the droplets are ionized and taken out in the vapor. Ions derived from the sample components thus generated are collected and subjected to mass spectrometry.

In order to perform highly sensitive component analysis in the LC-MS including the ion source as described above, it is important to optimize device parameters, such as a voltage applied to parts of the ion source, temperature of the parts, temperature in the ionization chamber, or flow rates of various gases used for ionization, so that ionization efficiency is as high as possible. Optimal values of the device parameters depend on types of target components (compounds), conditions of the mobile phases (types, flow rates, etc. of the mobile phases), and the like. Therefore, device parameters are generally optimized based on a result acquired by actually measuring a sample (generally, a standard sample) containing a target component while changing the value of each parameter within a predetermined range. When the number of measurement times for optimizing the device parameters is large, the efficiency of measurement is decreased, and also the amounts of sample and consumed materials such as mobile phase used increase, resulting in an increase in measurement cost. Therefore, it is desired to search for optimal parameter values, that is, optimal measurement conditions with a fewer number of measurement times.

When the number of parameters to be adjusted is N, and the number of values to be changed for one parameter is L, in an attempt to measure round-robin combinations of all parameter values, the number of measurement times becomes $L^N$ (hereinafter, this method is referred to as "exhaustive method"). For example, even if L and N each indicate a several number, the number of measurement times is considerably large.

On the other hand, a method for sequentially optimizing values of a plurality of parameters one by one has been known (hereinafter, this method is referred to as a "sequential method"). This sequential method is a method used in control software "Labsolutions Connect MRM" including an interface parameter optimization function provided by Shimadzu Corporation described in Non Patent Literature 1. In the sequential method, the number of measurement times is L×N, which is much smaller than in the above-described exhaustive method.

In the above-described exhaustive method, the optimal value is the best result among the measurement results acquired by combining the parameter values in a round-robin manner, that is, usually a measurement condition that maximizes the signal strength for a target compound. On the other hand, in a method in which measurement is made only for a specific combination of parameter values as in the sequential method, parameters having high detection sensitivity are not always achieved from an overall viewpoint even when the optimization of all parameters is done. That is, the optimization result may fall into a local optimal solution instead of a comprehensive optimal solution. In order to avoid this, the software described in Non Patent Literature 1 has a function of displaying a change in signal strength obtained at each measurement as a graph when the measurement is made while the value of a certain parameter is being changed. As a result, a user can verify whether appropriate optimization is done by checking such a graph. In addition, the user can select an appropriate measurement condition after checking the graph, and create a method file containing information indicating the measurement condition.

CITATION LIST

Patent Literature

Patent Literature 1: JP 2018-73360 A
Patent Literature 2: U.S. Pat. No. 8,039,795 B
Patent Literature 3: U.S. Pat. No. 6,759,650 B
Patent Literature 4: U.S. Pat. No. 7,098,452 B
Patent Literature 5: WO 2018/078693 A

Non Patent Literature

Non Patent Literature 1: "LabSolutions Connect MRM", [online], Shimadzu Corporation, [searched on Jul. 17, 2019], Internet
Non Patent Literature 2: Tagawa and 4 others, "Interface Parameter Optimization for LC-MS Sensitivity Measurement", Shimadzu Review Editor, published on Mar. 20, 2019, Shimadzu Review, Vol. 75, No. 3.4, pp. 131-135.
Non Patent Literature 3: (K. Swersky) and 2 others, "Multi-Task Bayesian Optimization", [online], [searched on Jul. 18, 2019], NIPS, 2013, Internet
Non Patent Literature 4 Snoke (J. Snoek) and 2 others, "Practical Bayesian Optimization of Machine Learning Algorithms", [online], [searched on Jul. 18, 2019], NIPS, 2012, Internet

SUMMARY OF INVENTION

Technical Problem

The present applicant proposes a multi-task Bayesian optimization method as a method for optimizing device parameters more efficiently than the sequential method (see Non Patent Literature 2). Although details of the multi-task Bayesian optimization method will be described later, in this method, the plurality of parameters are not sequentially optimized one by one. One feature of the multi-task Bayesian optimization method is to optimize a plurality of parameters while repeating an operation for making measurement while simultaneously changing values of the plurality of parameters and for determining, based on the measurement result, an appropriate value as a value of a device parameter that is a measurement condition in the next measurement. Therefore, even in the multi-task Bayesian optimization method, similarly to the sequential method, only a local solution may be acquired unless optimization is appropriately done. In order to avoid this, it is important for the user to check the optimization process associated with the actual measurement result.

However, in the multi-task Bayesian optimization method, usually, values of a plurality of parameters change simultaneously in each measurement. In parameter optimization, change in a parameter in a subsequent measurement is not determined beforehand because it is determined through the process of optimization of the previous measurement. Therefore, the method implemented by the software described in Non Patent Literature 1 cannot make a display that allows the user to easily understand the relationship between the change in each of the plurality of parameters and the signal strength. The user cannot easily determine and set an appropriate measurement condition that will not lead to a local solution without checking the relationship between the plurality of parameters and the signal strength.

The present invention is accomplished to solve such problems, and an object of the present invention is to provide a mass spectrometer and a program for the mass spectrometer that enable a user to easily check while optimizing device parameters whether the optimization of the device parameters is appropriately done or has been done, and to easily set appropriate measurement conditions based on a result of the optimization.

Solution to Problem

One aspect of a mass spectrometer according to the present invention is a mass spectrometer including an ion source using an atmospheric pressure ionization method for ionizing a component contained in a liquid sample, a mass separator configured to separate ions derived from the sample component in accordance with a mass-to-charge ratio, and a detector configured to detect separated ions, the mass spectrometer further including:
  a parameter optimization unit configured to optimize values of device parameters including a plurality of parameters that affect ionization efficiency in the ion source using a Bayesian optimization method, based on a result acquired by making measurements while changing the values of the device parameters;
  a display processor configured to display a sensitivity model which is a posterior distribution indicating a relationship between a plurality of parameters in all or some of the device parameters and signal strength estimated during the optimization of the device parameters by the parameter optimization unit, expressing as a graph like a heat map or an array of a plurality of the graphs on a display unit, and to sequentially update the sensitivity model; and
  a file creation unit configured to allow a user to designate a position on the graph displayed by the display processor and to create a method file containing a measurement condition used for sample measurement based on a combination of values of parameters corresponding to the designated position.

One aspect of a program for a mass spectrometer according to the present invention is a program used in a mass spectrometer including an ion source using an atmospheric pressure ionization method for ionizing a component contained in a liquid sample, a mass separator configured to separate ions derived from the sample component in accordance with a mass-to-charge ratio, and a detector configured to detect the separated ions, the program configured to optimize parameter values of device parameters including a plurality of parameters that affect ionization efficiency in the ion source, the program causing a computer to operate as:
  a measurement control function unit configured to control operations of the ion source, the mass separator, and the detector and to make measurements with values of device parameters determined by the optimization-time parameter determination function unit;
  an optimization-time parameter determination function unit configured to optimize parameter values based on a result obtained by the measurements made under control of the measurement control function unit using a Bayesian optimization method and to determine values of the device parameters in next measurement;
  a display processing function unit configured to display a sensitivity model which is a posterior distribution indicating a relationship between a plurality of parameters in all or some of the device parameters and signal strength estimated during the optimization of the device parameters by the measurement control function unit and the optimization-time parameter determination function unit, expressing as a graph like a heat map or an array of a plurality of the graphs on a display unit, and to sequentially update the sensitivity model; and
  a file creation function unit configured to allow a user to designate a position on the graph displayed on the display unit and to create a method file containing a measurement condition used in sample measurement, based on a combination of values of parameters corresponding to the designated position.

As a matter of course, in one aspect of the mass spectrometer and the program for the mass spectrometer according to the present invention, the Bayesian optimization method also includes the multi-task Bayesian optimization method disclosed in Non Patent Literatures 2 to 4 for example.

In one aspect of the mass spectrometer and the program for the mass spectrometer according to the present invention, the ion source using the atmospheric pressure ionization method for ionizing the component contained in the liquid sample can be typically an ion source using an electrospray ionization (ESI) method, an atmospheric pressure chemical ionization (APCI) method, or an atmospheric pressure photoionization (APPI) method.

Advantageous Effects of Invention

In the mass spectrometer using the above aspect of the mass spectrometer according to the present invention and the above aspect of the program for the mass spectrometer according to the present invention, every time when the sensitivity model which is the posterior distribution is updated in the process of progressing the optimization of the device parameters by the Bayesian optimization method, a graph like a heat map of the sensitivity model or the array of the graphs created on the screen of the display unit is sequentially updated. In the parameter optimization by the Bayesian optimization method, the change in the sensitivity model is great at the beginning, but the change in the sensitivity model decreases as the parameter approaches an optimal value. Therefore, the user can understand that the device parameter approaches the optimal value by visually recognizing the graph or the array of graphs. In addition, the user can check whether the optimization processing is appropriately performed, based on the graph of the sensitivity model or the array of graphs.

Then, when the user specifies a position where, for example, the signal strength is estimated to be highest (sensitivity is highest) on the graph of the sensitivity model at the time of termination of the optimization processing, the file creation function unit creates a method file based on a combination of values of the parameters corresponding to the specified position. This enables, for example, the user to easily set an appropriate measurement condition that does not lead to a local solution after determining the measurement condition. That is, the user can appropriately set the measurement condition through simple work.

BRIEF DESCRIPTION OF DRAWINGS

FIG. 8 is a diagram illustrating an example of comparison between a correct sensitivity model and a posterior distribution sensitivity model in parameter search using the multi-task Bayesian optimization method in the LC-MS according to the present embodiment.

DESCRIPTION OF EMBODIMENTS

A liquid chromatograph mass spectrometer (LC-MS) including a mass spectrometer according to an embodiment of the present invention will be described with reference to the accompanying drawings.

[Overall Configuration of LC-MS According to the Present Embodiment]

Figure 1:
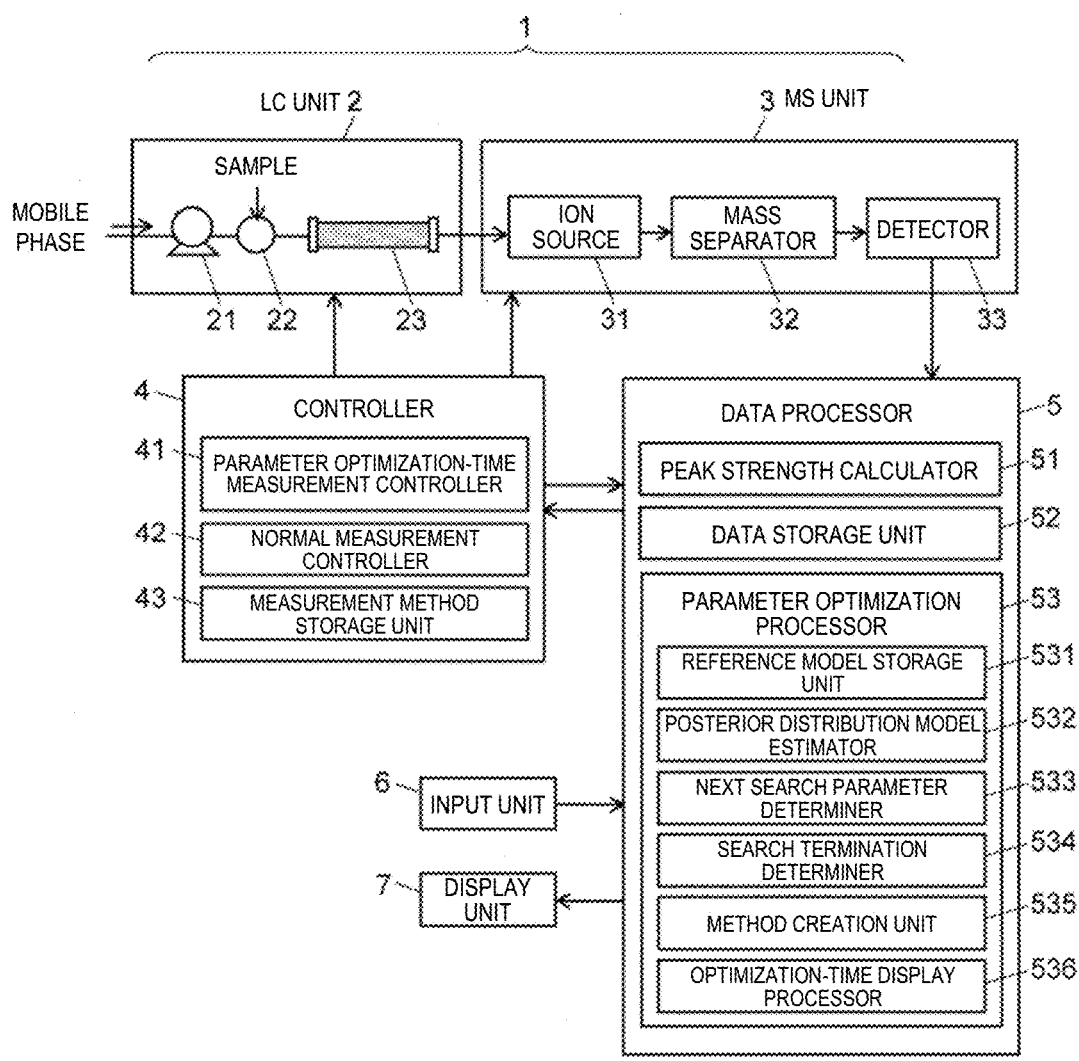
FIG. 1 is a schematic block configuration diagram of a liquid chromatograph mass spectrometer (LC-MS) according to one embodiment of the present invention.

FIG. 1 is a block configuration diagram of main components of the LC-MS according to the present embodiment.

The LC-MS according to the present embodiment roughly includes a measurement unit 1, a controller 4, a data processor 5, an input unit 6, and a display unit 7. The measurement unit 1 includes a liquid chromatograph unit (LC unit) 2 and a mass spectrometry unit (MS unit) 3. The liquid chromatograph unit 2 includes a liquid feeding pump 21, an injector 22, a column 23, and the like. The mass spectrometry unit 3 includes an ion source 31, a mass separator 32, a detector 33, and the like.

In the liquid chromatograph unit 2, a sample is injected from the injector 22 into a mobile phase fed by the liquid feeding pump 21, and the sample is sent to the column 23 by a flow of the mobile phase. Various components (compounds) in the sample are temporally separated while passing through the column 23, eluted from an outlet of the column 23, and introduced into the mass spectrometry unit 3. In the mass spectrometry unit 3, the ion source 31 ionizes components in the eluate from the column 23, and the mass separator 32 separates various generated ions in accordance with a mass-to-charge ratio m/z. The detector 33 detects ions separated in accordance with the mass-to-charge ratio and generates a detection signal in accordance with the amount of the ions.

The controller 4 controls operations of the measurement unit 1 and the data processor 5, and includes functional blocks such as a parameter optimization-time measurement controller 41, a normal measurement controller 42, and a measurement method storage unit 43. The data processor 5 receives data acquired by the measurement unit 1 to perform various types of data processing, and includes functional blocks such as a peak strength calculator 51, a data storage unit 52, and a parameter optimization processor 53. The parameter optimization processor 53 includes a reference model storage unit 531, a posterior distribution model estimator 532, a next search parameter determiner 533, a search termination determiner 534, a method creation unit 535, and an optimization-time display processor 536 as lower functional blocks.

Generally, most of the functional blocks of the controller 4 and the data processor 5 can be embodied by using a personal computer as a hardware resource and by causing the computer to execute a dedicated control and processing program installed in the computer. A program for the mass spectrometer according to an embodiment of the present invention is a part of the control and processing program. Naturally, such a computer program can be provided to the user by being stored in a non-transitory recording medium such as a compact disc read only memory (CD-ROM), a digital versatile disc read only memory (DVD-ROM), a memory card, or a universal serial bus (USB) memory (dongle). Alternatively, the program can be provided to the user in the form of data transfer via a communication line such as the Internet.

[Configuration and Schematic Operation of Ion Source in LC-MS According to the Present Embodiment]

Figure 2:
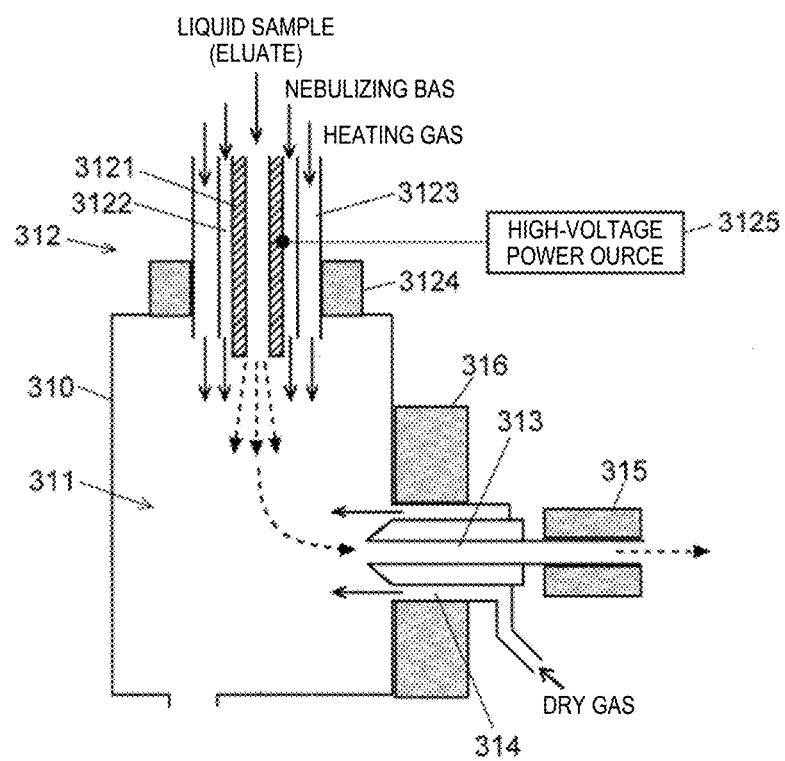
FIG. 2 is a schematic configuration diagram of an ion source in the LC-MS according to the present embodiment.

FIG. 2 is a schematic configuration diagram of the ion source 31 in the LC-MS according to the present embodiment. The ion source 31 is an electrospray ionization (ESI) ion source that is one of atmospheric pressure ion sources, and includes an ESI probe 312 that ionizes components in the eluate in an ionization chamber 311 in an approximately atmospheric pressure formed inside a chamber 310.

The ESI probe 312 includes a capillary 3121 through which an eluate flows, a nebulizing gas tube 3122 disposed to surround the capillary 3121, a heating gas tube 3123 disposed to surround the nebulizing gas tube 3122, an interface heater 3124 that heats mainly a gas in the heating gas tube 3123, and a high-voltage power source 3125 that applies a high voltage to the capillary 3121. The ionization chamber 311 and an intermediate vacuum chamber (not illustrated) at a next stage communicate with each other through a desolvation tube 313 having a small diameter. A desolvation tube heater 315 is provided around the desolvation tube 313 so as to heat the desolvation tube 313. A dry gas tube 314 for ejecting a dry gas into the ionization chamber 311 is disposed around an inlet portion (ion introduction port) of the desolvation tube 313. The block heater 316 mainly heats the gas in the dry gas tube 314.

An ion generation operation in the ion source 31 having the above configuration will be briefly described.

When the eluate eluted from the outlet of the column 23 reaches the vicinity of the distal end of the capillary 3121, a biased charge is applied to the eluate by a DC electric field formed by a high voltage (about several kV at the maximum) applied from the high-voltage power source 3125 to the capillary 3121. The charged eluate is nebulized as fine droplets (charged droplets) into the ionization chamber 311 with the aid of the nebulizing gas ejected from the nebulizing gas tube 3122. The nebulized droplets come into contact with gas molecules in the ionization chamber 311 and are split to be fine. Since the high-temperature heating gas ejected from the heating gas tube 3123 flows to surround the nebulizing flow derived from the eluate, the vaporization of the solvent from the droplets is promoted, and the spread of the nebulizing flow is decreased. In the process of vaporizing the solvents from the droplets, the component molecules in the droplets have charges and jump out from the droplets to become gas ions.

A gas flow that is sucked from the ionization chamber 311 into the desolvation tube 313 is formed by a pressure difference between both opening ends of the desolvation tube 313. As described above, the fine charged droplets in which the ions and the solvent derived from the sample component generated in the ionization chamber 311 has not been completely vaporized yet are carried by the gas flow and sucked into the desolvation tube 313. Since the high-temperature dry gas is ejected from the dry gas tube 314 in a direction opposite to the suction direction, the solvent from the charged droplets is exposed to the dry gas to further vaporize. Since the desolvation tube 313 is heated to a high temperature by the desolvation tube heater 315, the vaporization of the solvents from the charged droplets also progresses in the desolvation tube 313. This further promotes ionization, and a large amount of ions derived from the sample component are sent to the intermediate vacuum chamber at the next stage and subjected to mass spectrometry.

As for the ion source 31, main device parameters that affect ionization efficiency include the following seven parameters.

(1) Interface temperature (hereinafter, occasionally abbreviated as "IFT" or "I/F temperature")

This is the temperature of the interface heater 3124 that heats the gas in the heating gas tube 3123 and the vicinity of the distal end of the ESI probe 312.

(2) Block heater temperature (hereinafter, occasionally abbreviated as "BHT" or "BH temperature")

This is mainly the temperature of the block heater 316 that heats the gas in the dry gas tube 314.

(3) Desolvation tube temperature (hereinafter, occasionally abbreviated as "DLT" or "DL temperature")

This is mainly the temperature of the desolvation tube heater 315 that heats the desolvation tube 313.

(4) Interface voltage (hereinafter, occasionally abbreviated as "IFV" or "IN voltage")

This is the voltage for forming an electric field for applying a charge to the eluate nebulized as droplets, and is a high voltage (the polarity depends on an ionization mode, and may be either positive or negative) applied to the distal end of the ESI probe 312 in the present embodiment.

(5) Nebulizing gas flow rate (hereinafter, occasionally abbreviated as "NebGas")

This is the flow rate of the nebulizing gas that assists the ejection of the eluate flowing to the vicinity of the ejection port at the distal end of the ESI probe 312 through the nebulizing gas tube 3122.

(6) Heating gas flow rate (hereinafter, occasionally abbreviated as "HeatGas")

This is a flow rate of the high-temperature gas flowing from the periphery of the capillary 3121 through the heating gas tube 3123 in the same direction as the nebulizing flow of the droplets.

(7) (Dry gas flow rate (hereinafter, occasionally abbreviated as "DryGas")

This is a flow rate of the dried gas flowing through the dry gas tube 314 in the direction opposite to the gas suction direction into the desolvation tube 313.

When the values of the seven parameters are changed, ionization efficiency changes, the amount of ions subjected to mass spectrometry changes, and detection sensitivity (signal strength) in the detector 33 also changes. Since the degree of change in detection sensitivity and the direction of change depend on the component (compound), the parameter values for each compound needs to be optimized in order to make highly sensitive measurement.

In the LC-MS according to the present embodiment, a multi-task Bayesian optimization method obtained by improving a general Bayesian optimization method is used in order to optimize the device parameters affecting the ionization efficiency described above. First, the Bayesian optimization method will be schematically described with reference to FIGS. 4A to 4C, 5A and 5B.

[Overview of Parameter Optimization Using Bayesian Optimization Method]

In the case of searching for the optimal value of a certain parameter, it is desirable that the optimal value can be searched for with the least number of measurement times. This problem is generalized to a problem of "search for value of parameter that provides best measurement value in repetitive measurement". The best measurement value here is generally a maximum signal strength value, but may be a measurement value having a maximum signal-to-noise (SN) ratio, a minimum measurement value, or the like depending on the purpose of measurement or the like.

Figure 4A:
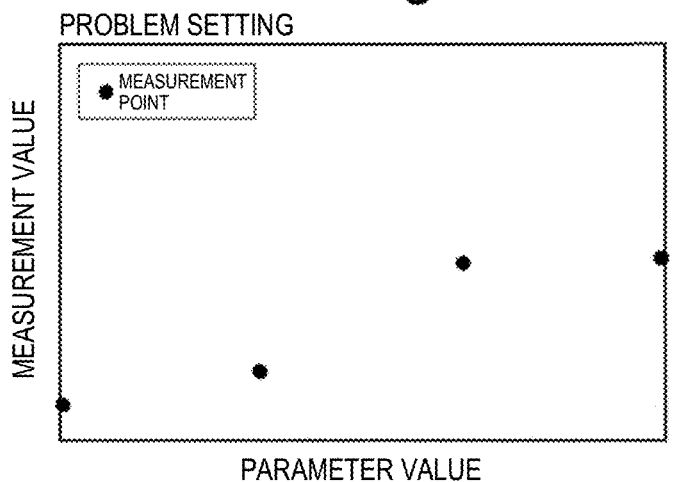
FIGS. 4A to 4C are graphs illustrating examples of problem setting and solution in parameter search.

As an example, as illustrated in FIG. 4A, it is assumed that measurement for four different parameter values related to a certain parameter (for example, voltage) has been terminated, and four measured values indicated by black dots in the drawing have been acquired. A considered case is searching for a next parameter value that can be expected to provide a measurement value larger than the four measurement values.

Figure 4B:
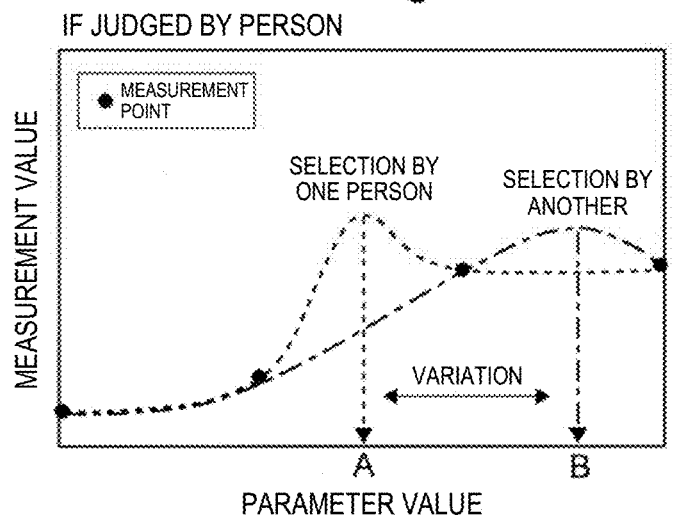

When a user (operator) selects a parameter value to be set next by their own judgment, it is inevitable that selection of the next parameter value varies depending on what kind of measurement target model is assumed (A and B in the drawing) as indicated by a dotted line and an alternate long and short dashed lines in FIG. 4B.

Figure 4C:
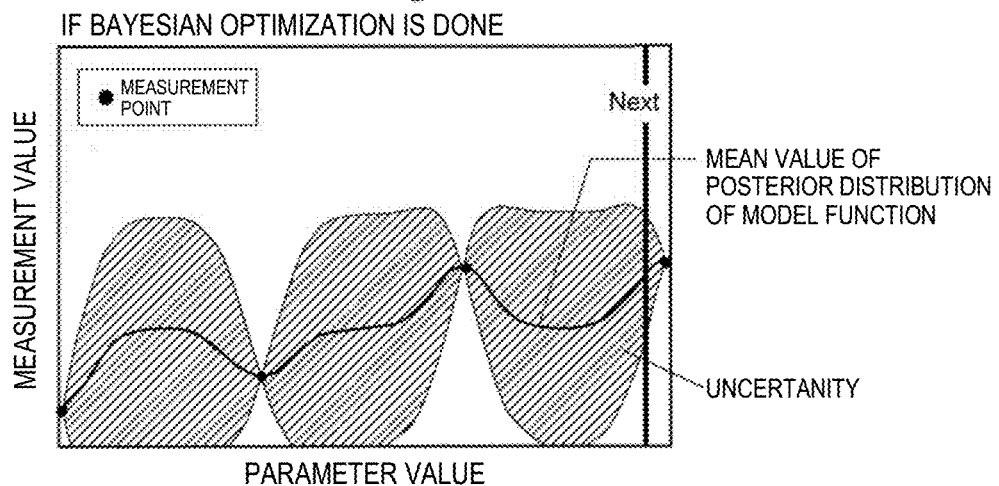

On the other hand, with the Bayesian optimization method (see Patent Literature 1 and the like, which is well known as a method for searching parameter, the next parameter value (measurement condition) with which a probabilistically good result can be expected can be determined based on acquired measurement data. FIG. 4C is a graph illustrating a result of estimating a model of a measurement target from the four measured values by the Bayesian optimization method and then searching for a parameter value to be measured next. In FIG. 4C, a curve indicated by a solid line indicates a mean value of a posterior distribution of a model function estimated by the Bayesian optimization method, a hatched range indicates uncertainty (or variance) of the posterior distribution of the model function, and a vertical thick solid line with "Next" indicates a next parameter value automatically selected.

More specifically, in the Bayesian optimization method, the mean value and the variance value of the posterior distribution of the model function are calculated based on the acquired measurement data under the assumption that the model to be measured (hereinafter, "model" is a distribution substantially indicating a relationship between a parameter value and a signal strength value or sensitivity) follows a Gauss process. The next measurement condition (parameter value) that is expected to improve the model so that the model approaches the true model is determined based on these calculated values. The next measurement is made under the determined measurement condition to acquire new measurement data. The posterior distribution of the model function is re-estimated by adding the new measurement data to the already acquired measurement data, and the accuracy of the posterior distribution of the model function is enhanced. Repetition of such processing enables acquisition of a parameter value that can provide a more satisfactory measured value.

Figure 5A:
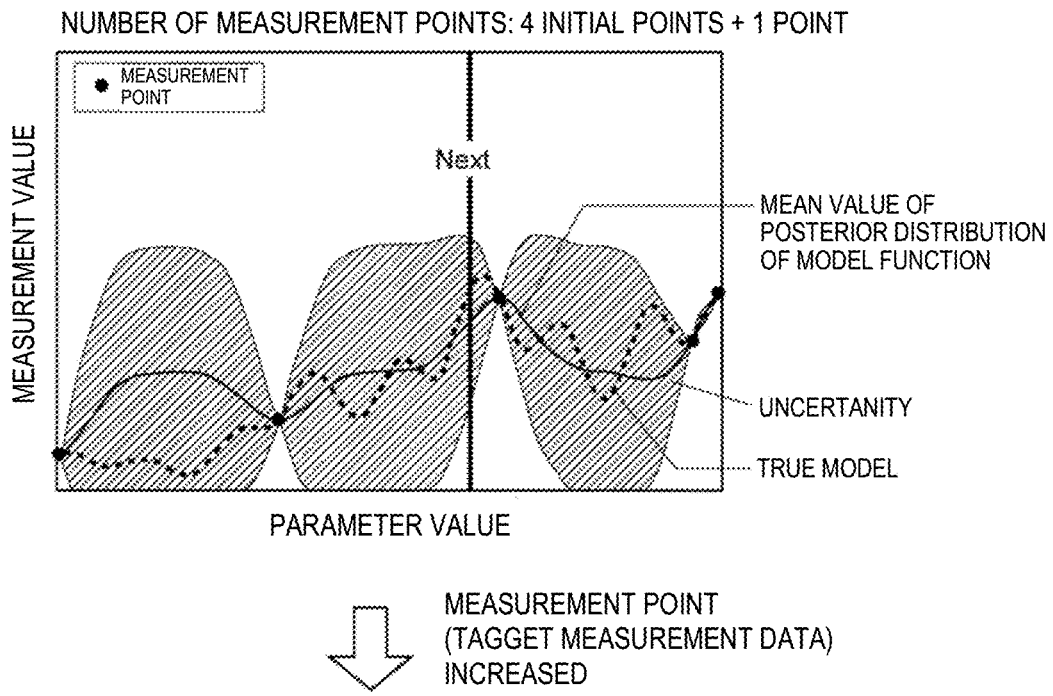
FIGS. 5A and 5B are graphs illustrating examples of parameter search in a Bayesian optimization method.
Figure 5B:
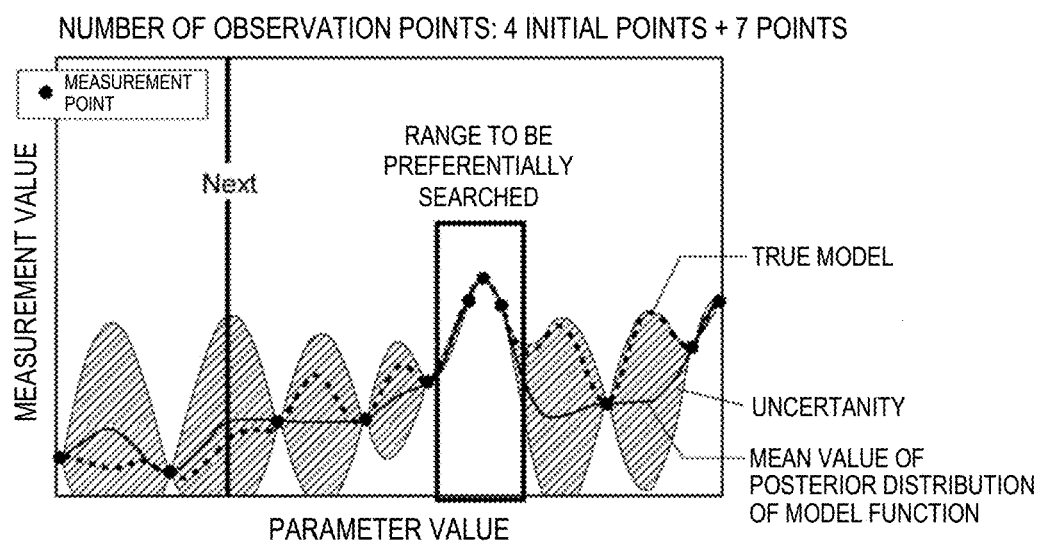

FIGS. 5A and 5B are graphs illustrating an example of parameter search using the Bayesian optimization method. FIG. 5A is a graph of a state in which one more measured value is added to the four initial measured values (identical to the values in FIG. 4A), and FIG. 5B is a graph of a state in which seven more measured values are added to the four initial measured values. Similarly to FIG. 4C, black dots indicate measurement values, a solid curve indicates a mean value of the estimated posterior distribution of model function, a dotted curve indicates a true model, a hatched range indicates uncertainty of the posterior distribution of model function, and a vertical thick solid line with "Next" indicates a next parameter value automatically selected. As illustrated in FIG. 5B, when the measurement is repeated while the parameter value is being changed, the parameter search is preferentially made in a range near the parameter value that provides the largest measured value. This makes it possible to find parameter value with which the measured value is largest or approximately largest.

The above description refers to an example of a case where only one device parameter is optimized. It goes without saying that the Bayesian optimization method enables extension in which a plurality of parameters is optimized in parallel.

In the general Bayesian optimization method described above, estimation accuracy of the posterior distribution of the model function at the initial search with a small number of observation points is comparatively low, and thus efficient search may be difficult. In order to overcome this situation, in recent years, a multi-task Bayesian optimization method obtained by improving the Bayesian optimization method has been proposed (Non Patent Literature 2 to 4). In the multi-task Bayesian optimization method, it is assumed that data has been acquired in each of an experiment on target measurement (hereinafter, referred to as "target experiment") and an experiment related to the target experiment (hereinafter, referred to as "reference experiment"). A model of the target experiment is estimated under the assumption that data from the target experiment is correlation with data from the reference experiment. As described in Non Patent Literature 2, in the multi-task Bayesian optimization method, a model of the target experiment can be estimated with considerably high accuracy even at initial search with a small number of observation points, and thus, search efficiency particularly at the initial search can be improved.

For the above reason, in the LC-MS according to the present embodiment uses the multi-task Bayesian optimization method for the parameter optimization, but may use the normal Bayesian optimization method.

[Processing Procedure of Parameter Optimization in LC-MS According to the Present Embodiment]

Figure 3:
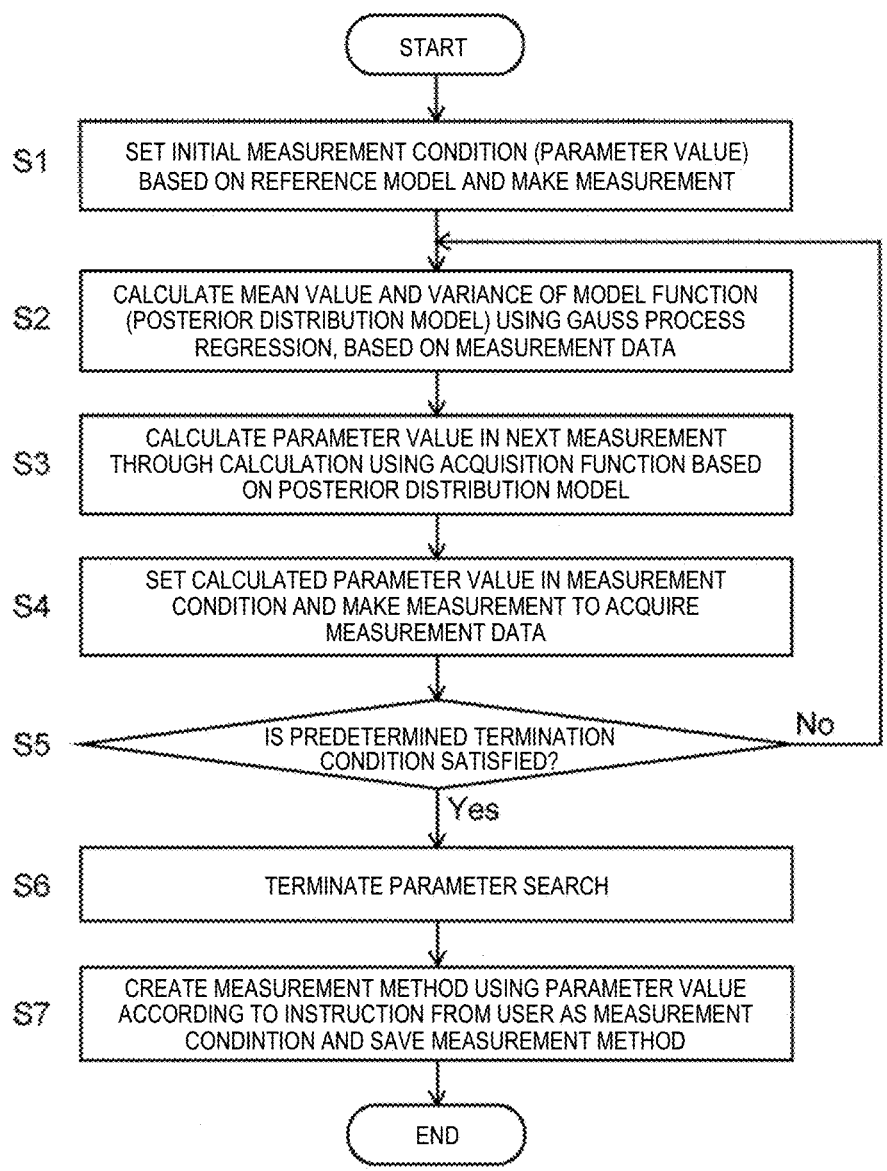
FIG. 3 is a flowchart illustrating processing for parameter search using a multi-task Bayesian optimization method in the LC-MS according to the present embodiment.

FIG. 3 is a flowchart illustrating processing for parameter optimization using the multi-task Bayesian optimization method in the LC-MS according to the present embodiment. An operation for the parameter optimization in the LC-MS according to the present embodiment will be described with reference to FIG. 3.

The algorithm of the multi-task Bayesian optimization is described in detail in Non Patent Literature 3 and 4 and the like. The algorithm itself is not the gist of the present invention, and thus, a detailed description of the algorithm will be omitted.

The multi-task Bayesian optimization requires a reference model based on measured values acquired by the present device or a device similar to the present device. This reference model can be created, for example, based on actual measurement data acquired by performing comprehensive measurement using another device of the same type as the present device. The "model" in this case is a sensitivity model indicating a distribution of measured values in a 7-dimensional space in which each of the seven parameters has one dimension, that is, signal strength values acquired by the LC-MS. Data constituting the reference model is stored in the reference model storage unit 531 in advance.

The sensitivity model is represented as a signal strength distribution in the 7-dimensional space corresponding to the seven device parameters. Although arithmetic processing can be performed based on such a sensitivity model, it is difficult to display the sensitivity model so that the user can easily understand the sensitivity model. Therefore, although the data processing itself in the parameter optimization processor 53 is performed for all the seven device parameters being reflected, the number of dimensions of the display itself of the sensitivity model on the display unit 7 is reduced to four. According to studies by the present inventors, parameters that particularly affect ionization efficiency include four parameters: an interface voltage (IFV); a nebulizing gas flow rate (NebGas); a heating gas flow rate (HeatGas); and a dry gas flow rate (DryGas). Therefore, on the display, the sensitivity model for these four parameters is represented by a graph in which a graph like a heat map is two-dimensionally arranged (hereinafter, referred to as "heat map-like two-dimensional arrangement graph") as illustrated in FIG. 6.

Figure 6:
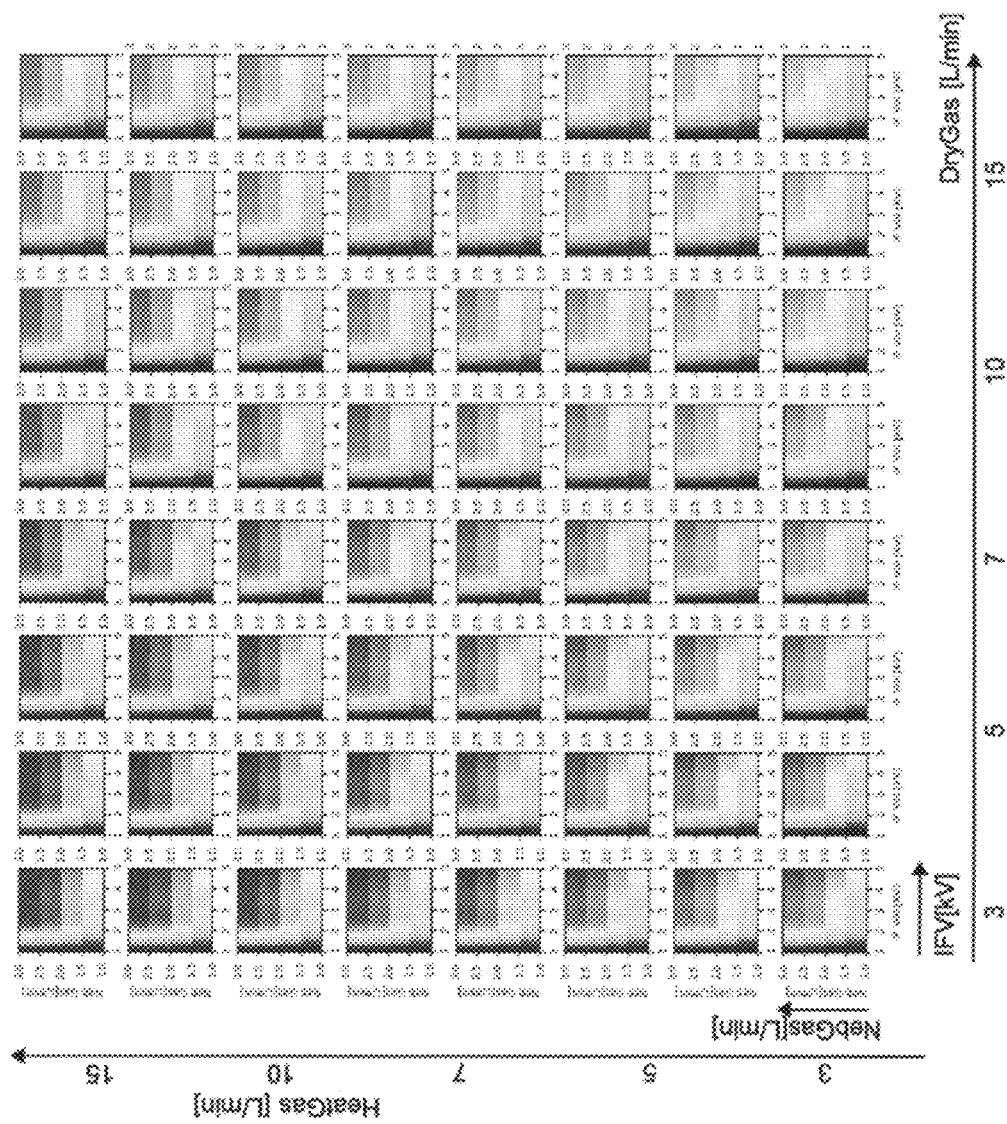
FIG. 6 is a diagram illustrating an example of display of a sensitivity model that is a posterior distribution in parameter search using the multi-task Bayesian optimization method in the LC-MS according to the present embodiment.

In one heat map-like approximately square graph in FIG. 6, a horizontal axis represents an interface voltage (IFV), a vertical axis represents a nebulizing gas flow rate (NebGas), and a signal strength value (or sensitivity) is represented in accordance with a predetermined color scale. An axis of a horizontal array of the plurality of heat map-like graphs represents a dry gas flow rate (DryGas), and an axis of a vertical array represents a heating gas flow rate (HeatGas). Information of the signal strength distribution in a four-dimensional space is represented as a whole by two-dimensionally arranging the two-dimensional graphs in this manner. Therefore, one point (strictly, one pixel) in one heat map-like graph in the heat map-like two-dimensional array graph indicates a signal strength value corresponding to one combination of the four parameter values.

First, the next search parameter determiner 533 determines initial measurement conditions, that is, respective values of seven device parameters, based on the reference model stored in the reference model storage unit 531. The parameter optimization-time measurement controller 41 sets the determined measurement conditions in the measurement unit 1 and then controls the operation of the measurement unit 1 so that measurement (LC/MS analysis) is made. Normally, since the optimization of the device parameters is done for each compound, a standard sample containing a target compound is used as a sample at this time, and measurement for the compound is made (step S1). In the data processor 5, the peak strength calculator 51 acquires, for example, a height (or area) of a peak on an extraction ion chromatogram at a specific mass-to-charge ratio derived from the target compound as a signal strength value.

The posterior distribution model estimator 532 calculates the mean and variance of the model function using Gauss process regression based on the data constituting the reference model and the actual measurement data to estimate the posterior distribution (posterior distribution model) of the model function (step S2). The next search parameter determiner 533 calculates measurement conditions for next measurement, that is, seven parameter values, through calculation using an acquisition function based on the estimated posterior distribution model (step S3). The parameter optimization-time measurement controller 41 sets the determined new measurement condition in the measurement unit 1, controls the operation of the measurement unit 1 so that measurement (LC/MS analysis) is made, and acquires measurement data (step S4).

The search termination determiner 534 determines whether a predetermined repetition termination condition is satisfied (step S5). The repetition termination condition can be satisfied, for example, when the number of repetitions of the routine reaches a preset value, when the measured value (signal strength value) reaches a predetermined target, or the like. As another condition, in the LC-MS according to the present embodiment, a determination is made that the termination condition is also satisfied when the user gives an optimization cancel instruction as described later. Then, when the determination is made in step S5 that the repetition termination condition is not satisfied yet (No in step S5), the processing returns to step S2, and the posterior distribution model is estimated again based on the newly acquired measurement value and the parameter value at that time. In such a manner, the processing in steps S2 to S5 is repeated, and when the repetition termination condition is satisfied, the parameter search is terminated (step S6).

Thereafter, the method creation unit 535 extracts a combination of parameter values based on the search result in accordance with a user's instruction as described later, for example, and creates a measurement method using the combination of parameter values as a measurement condition. Then, the created measurement method is stored in the measurement method storage unit 43 as the measurement method corresponding to the target compound (step S7). In such a manner, the measurement method for a certain compound is created. Therefore, when a plurality of compounds is to be measured, the method creation unit 535 may similarly make parameter optimization for each compound to create a measurement method.

[Display Processing During Parameter Optimization in LC-MS According to the Present Embodiment]

As described above, in the LC-MS according to the present embodiment, the device parameters are optimized while the processing for the measurement, the estimation of the posterior distribution model based on the measurement result, and the determination of the parameters in the next measurement is being repeated more than once. During the processing, the optimization-time display processor 536 performs characteristic display processing.

That is, as described above, during the device parameter optimization, the posterior distribution model is updated every time when the measurement is made under a new measurement condition. Schematically, the posterior distribution model changes so as to gradually approach a correct sensitivity model (certainly, the correct sensitivity model is unknown) as the measurement is repeated. When the difference from the correct sensitivity model decreases, the change in the posterior distribution model for each measurement decreases. That is, the change in the posterior distribution model saturates as the posterior distribution model approaches the correct sensitivity model. This means that when the posterior distribution model is close to the correct sensitivity model to some extent, the effect of additionally making the measurement is weakened, and unfortunately, the time required for the optimization becomes apparently longer.

Therefore, in the LC-MS according to the present embodiment, the optimization-time display processor 536 represents the posterior distribution model as a heat map-like two-dimensional array graph as illustrated in FIG. 6 to visualize the posterior distribution model on the screen of the display unit 7, and updates the heat map-like two-dimensional array graph to the latest one every time when the posterior distribution model is updated by making the measurement.

Figure 7:
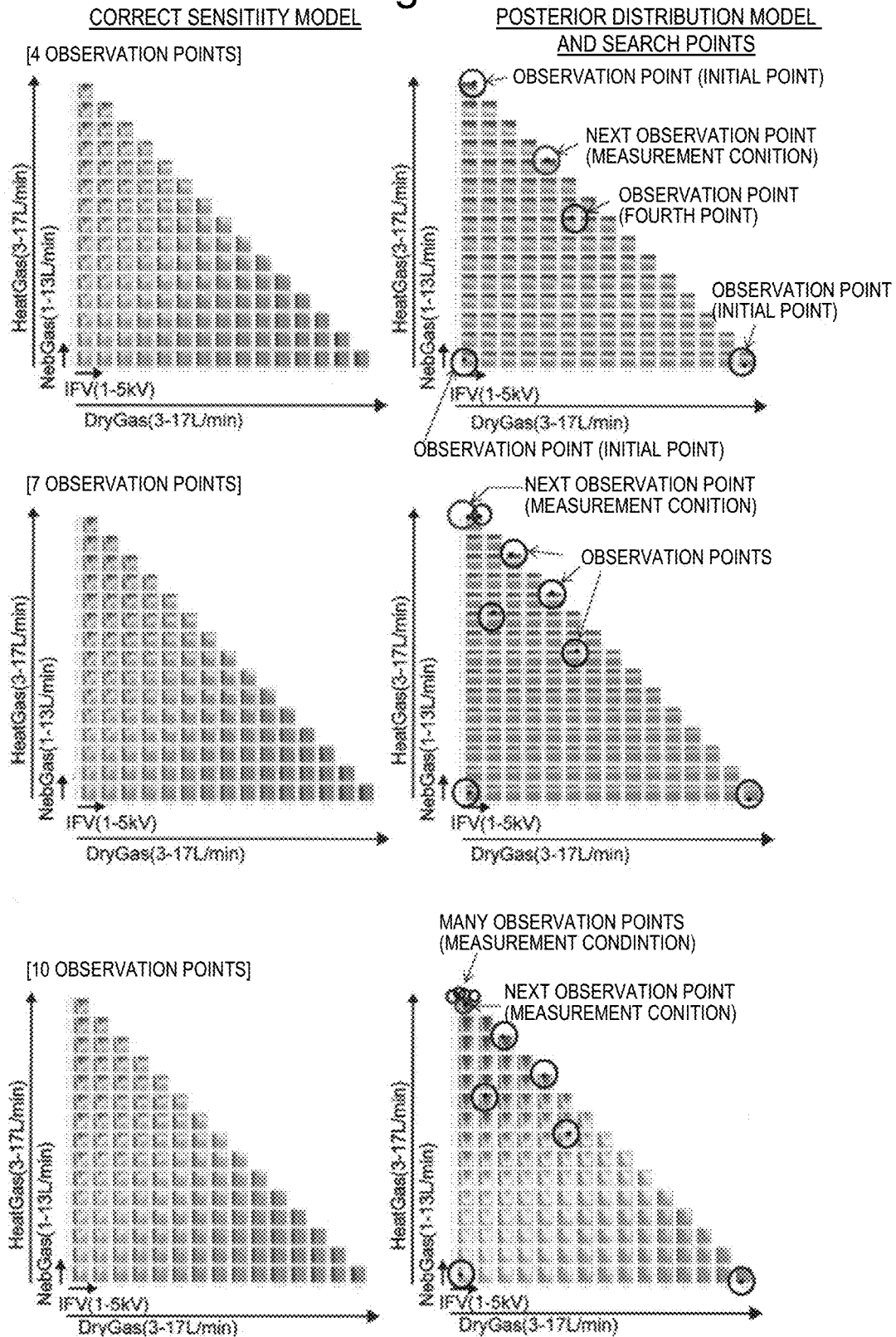
FIG. 7 is a diagram illustrating an example of comparison between a correct sensitivity model and a posterior distribution sensitivity model in parameter search using the multi-task Bayesian optimization method in the LC-MS according to the present embodiment.

FIGS. 7 and 8 are diagrams illustrating an example of comparison between a change in the posterior distribution model with an increase in the number of measurement times and a correct sensitivity model. The posterior distribution model also indicates observation points (measurement conditions) and next observation points (that is, points acquired as a result of search). The correct sensitivity model illustrated on the left side of FIGS. 7 and 8 is merely illustrated for comparison, and the correct sensitivity model is actually unknown as described above. On the right sides of FIGS. 7 and 8, a heat map-like two-dimensional array graph of a posterior distribution model is illustrated. Here, in order to avoid complication of the drawing, only about half of the two-dimensional array having an approximately rectangular shape is illustrated. However, it is actually preferable that the entire two-dimensional array graph is displayed as illustrated in FIG. 6.

As is clear from FIGS. 7 and 8, the posterior distribution model close to the correct sensitivity model can be estimated as the number of observation points increases. The measurement condition under which the signal strength increases can be preferentially searched at the position of the observation point added in the process of increasing the number of observation points.

A comparison is made between the graphs illustrating the posterior distribution models in cases of the 10 observation points illustrated in FIG. 7, the 13 observation points and the 16 observation points illustrated in FIG. 8. The change in the posterior distribution model is great in the process of increasing the number of observation points from 10 to 13, whereas the change in the posterior distribution model is small in the process of increasing the number of observation points from 13 to 16. When the user observes such a change in the posterior distribution model on the heat map-like two-dimensional array graph, the user can estimate that accurate estimation has been made to some extent in the vicinity of the 13 observation points.

Therefore, when the user judges that the optimization has been done to a satisfactory extent by checking the heat map-like two-dimensional array graph updated every time when the measurement is made, the user gives an optimization cancel instruction by performing a predetermined operation using the input unit 6. Then, the search termination determiner 354 that has accepted this instruction determines that the termination condition is satisfied when the processing in step S5 is performed next. That is, for example, even before the number of repetition times of the routine reaches a preset value, the parameter search is terminated by the judgment of the user. As a result, in a case where the parameter has already been optimized to a certain level of a user demand and it is difficult to expect a great improvement in sensitivity although more time is spent, the parameter search can be terminated at that time.

After the termination of the parameter search as described above, in a state in which the heat map-like two-dimensional array graph of the final posterior distribution model illustrated in FIG. 6 is displayed on the screen of the display unit 7, the user instructs, through the input unit 6, the position of the measurement condition that is estimated to be most appropriate and normally provides the maximum signal strength value. Then, a combination of parameter values corresponding to a position instructed by the user is specified on the heat map-like two-dimensional array graph, and a measurement method is created using the specified combination of parameter values as a measurement condition. As a result, the user can create a measurement method storing favorable measurement conditions for a certain compound only through performing a click operation on a pointing device, for example.

As described above, in the parameter optimization processing in the LC-MS according to the present embodiment, the measurement condition in the next measurement is automatically determined based on the measurement result. However, the user may set a desired measurement condition (a desired point on the graph illustrated in FIG. 6) during the determination, and the processing in steps S2 to S4 may be performed based on the measurement result acquired under the set measurement condition. In this case, the measurement condition desirably set by the user is generally a measurement condition under which measurement has not been made in the parameter optimization processing, but may be a measurement condition under which measurement has already been made more than once in the parameter optimization processing.

Such setting of the measurement condition by the user described above is useful, for example, in a case where it is known that a satisfactory measurement result can be acquired under a certain measurement condition as some prior information, and measurement under the measurement condition has not yet been made in the parameter optimization processing.

[Modifications]

In the LC-MS according to the above embodiment, optimization is done for seven device parameters that affect ionization efficiency, but obviously, not all of the seven parameters are required. When the number of parameters to be optimized is 3 or less, the number of dimensions of the heat map-like two-dimensional array graph may be decreased in accordance with the number of parameters.

Even if the ion source 31 is an ESI ion source, the configuration illustrated in FIG. 2 is merely an example, and the configuration can be variously changed. Then, with the change in the configuration, the contents of the parameters that affect the ionization efficiency can be appropriately changed. That is, elements that affect the ionization efficiency in the ESI ion source variously include the charged state of the eluate nebulized into an approximately atmospheric pressure, the size of the droplets to be nebulized, the ease in vaporization of the solvents from the droplets, and the collection efficiency of guiding the generated ions to the desolvation tube or the ion intake part (for example, sampling cone) corresponding to the desolvation tube. Parameters that affect any of these elements can be subjected to parameter optimization as described above.

For example, in a mass spectrometer described in Patent Literature 2, a conductive capillary through which a liquid sample is transported is grounded, a high voltage is applied to a nozzle provided to surround the capillary, and an electric field formed by a potential difference between the nozzle and the capillary applies an electric charge to a droplet. When the voltage applied to the nozzle is changed, the strength of the electric field is changed, whereby the charging state of the droplet is also changed, and this also affects the ionization efficiency. Therefore, in such a configuration, obviously, the voltage applied to the nozzle rather than the capillary corresponds to the interface voltage in the above embodiment.

In the ion source 31 according to the above embodiment, the blowing direction of the heating gas that promotes vaporization of the solvents from the droplets is approximately identical to the direction of the nebulizing flow of the eluate. However, for example, the mass spectrometer described in Patent Literature 3 is configured so that a high-temperature gas flow is blown to the nebulizing flow of the eluate from two directions different from the direction of the nebulizing flow of the eluate. In the mass spectrometer described in Patent Literature 4, a gas flow is formed to face the nebulizing flow of the eluate. In such a configuration, although the direction of the gas flow with respect to the nebulizing flow of the eluate is different from the direction in the above embodiment, the purpose of enhancing the ionization efficiency through the promoting the vaporization of the solvents from the droplets is identical to the purpose in the above embodiment. Thus, it is obvious that these gases correspond to the heating gas and the dry gas in the above embodiment. In addition, the gas blown to the nebulizing flow of the eluate in this manner is not necessarily heated, and heating is not necessarily essential. This is because obviously the gas has action of promoting vaporization of the solvents from the droplets to one degree or another.

In the ion source 31 according to the above embodiment, ions generated in the ionization chamber 311 are mainly guided to the desolvation tube 313 by the gas flow, but ions generated in the nebulizing flow may be attracted to the inlet of the desolvation tube 313 by the action of an electric field. For example, in a mass spectrometer described in Patent Literature 5, a convergence electrode and a reflection electrode are disposed in front of a direction in which an eluate is nebulized from a capillary, and generated ions are attracted to the vicinity of an inlet of a desolvation tube while being converged by an action of an electric field formed by these electrodes. As a result, the use efficiency (ion collection efficiency) of the generated ions is improved, thereby producing an effect identical to the effect of substantially increasing the ionization efficiency. Therefore, the voltage applied to the convergence electrode or the reflection electrode can also be a target for parameter optimization.

When the ion source is an ion source using an ionization method other than the ESI method, naturally, a parameter specific to the configuration of the ion source can be a parameter that affects the ionization efficiency. For example, in an APCI ion source, a high voltage applied to a needle-shaped electrode is an important parameter. In the APPI ion source, the intensity (power) of a laser beam emitted to the nebulizing flow of the eluate is an important parameter.

The parameters optimized by the Bayesian optimization method or the multi-Bayesian optimization method may include device parameters other than the parameters that affect the ionization efficiency. Various parameters in the mass spectrometry unit 3 can be subject to the above-described parameter optimization. The various parameters include, for example, a voltage applied to one or more ion transport optical systems for transporting the generated ions to the mass separator 32 such as a quadrupole mass filter, and collision energy required when a collision cell dissociates ions in a case of a configuration including the collision cell for dissociating ions.

Furthermore, a mobile phase flow rate, a column oven temperature, an organic solvent ratio of the mobile phase, and the like, which are the LC separation conditions in the liquid chromatograph unit 2, can also be the target for the parameter optimization described above. When such LC separation conditions are optimized by the above method, the change in the parameter values causes a change in the area of a peak on the chromatogram corresponding to the target compound, but hardly causes a change in the peak height. Therefore, when the parameters related to the LC separation conditions are optimized, it is preferable that the signal strength of the target compound is the peak area rather than the peak height.

The above embodiment and modifications are merely examples of the present invention, and naturally, as to the other points, modifications, corrections, additions, and the like appropriately made within the scope of the gist of the present invention are included in the claims of the present application.

[Various Aspects]

It is easily understood by those skilled in the art that the above-described exemplary embodiment and modifications of the exemplary embodiment are specific examples of the following aspects.

(Clause 1) A mass spectrometer according to clause 1 is a mass spectrometer including an ion source using an atmospheric pressure ionization method for ionizing a component contained in a liquid sample, a mass separator configured to separate ions derived from the sample component in accordance with a mass-to-charge ratio, and a detector configured to detect separated ions, the mass spectrometer further including:
  a parameter optimization unit configured to optimize values of device parameters including a plurality of parameters that affect ionization efficiency in the ion source using a Bayesian optimization method, based on a result acquired by making measurements while changing the values of the device parameters;
  a display processor configured to display a sensitivity model which is a posterior distribution indicating a relationship between a plurality of parameters in all or some of the device parameters and signal strength estimated during the optimization of the device parameters by the parameter optimization unit, expressing as a graph like a heat map or an array of a plurality of the graphs on a display unit, and to sequentially update the sensitivity model; and
  a file creation unit configured to allow a user to designate a position on the graph displayed by the display processor and to create a method file containing a measurement condition used for sample measurement, based on a combination of values of parameters corresponding to the designated position.

(Clause 7) A program for a mass spectrometer according to a seventh clause is a program used in a mass spectrometer including an ion source using an atmospheric pressure ionization method for ionizing a component contained in a liquid sample, a mass separator configured to separate ions derived from the sample component in accordance with a mass-to-charge ratio, and a detector configured to detect the separated ions, the program configured to optimize parameter values of device parameters including a plurality of parameters that affect ionization efficiency in the ion source, the program causing a computer to operate as:
  a measurement control function unit configured to control operations of the ion source, the mass separator, and the detector and to make measurements with values of device parameters determined by the optimization-time parameter determination function unit;
  an optimization-time parameter determination function unit configured to optimize parameter values based on a result obtained by the measurements made under control of the measurement control function unit using a Bayesian optimization method and to determine values of the device parameters in next measurement;
  a display processing function unit configured to display a sensitivity model which is a posterior distribution indicating a relationship between a plurality of parameters in all or some of the device parameters and signal strength estimated during the optimization of the device parameters by the measurement control function unit and the optimization-time parameter determination function unit, expressing as a graph like a heat map or an array of a plurality of the graphs on a display unit, and to sequentially update the sensitivity model; and
  a file creation function unit configured to allow a user to designate a position on the graph displayed on the display unit and to create a method file containing a measurement condition used in sample measurement, based on a combination of values of parameters corresponding to the designated position.

According to the mass spectrometer in clause 1 and the program for the mass spectrometer described in clause 7, every time when the sensitivity model, which is the posterior distribution, is updated in the process of progressing the optimization of the device parameters in the Bayesian optimization method, the graph like a heat map of the sensitivity model depicted on the screen of the display unit is sequentially updated. As a result, the user can understand that the device parameters have approached the optimal value by visually recognizing the graph. Further, the user can check whether the optimization processing is appropriately performed, based on the graph of the sensitivity model. According to the mass spectrometer in clause 1 and the program for the mass spectrometer in clause 7, for example, after the user judges an appropriate measurement condition that does not fall into a local solution, it is possible to easily set the measurement conditions and create the measurement method.

(Clause 2) The mass spectrometer according to clause 1 may further include a cancel instruction acceptance unit configured to allow the user to give an instruction for cancelling the optimization of the device parameters in the parameter optimization unit during the optimization, wherein the parameter optimization unit is configured to cancel the optimization of the device parameters in response to acceptance of the cancel instruction from the cancel instruction acceptance function unit.

(Clause 8) The program for the mass spectrometer according to clause 7 may further include a cancel instruction acceptance function unit configured to allow the user to give an instruction for cancelling the optimization of the device parameters in the optimization-time parameter determination function unit during the optimization,
wherein the optimization-time parameter determination function unit and the measurement control function unit are configured to cancel the optimization of the device parameters in response to acceptance of the cancel instruction by the cancel instruction acceptance function unit.

According to the mass spectrometer in clause 2 and the program for the mass spectrometer in clause 8, when the user checks the graph like a heat map of the sensitivity model on the display screen sequentially updated in accordance with the progress of the parameter optimization and judges that the optimization is done to an approximately satisfactory extent, the parameter optimization processing can be terminated in response to the instruction from the user. As a result, it is possible to determine measurement conditions that can achieve sufficient performance while shortening the time required for parameter optimization.

(Clause 3) In the mass spectrometer according to clause 1, the parameter optimization unit may be configured to optimize parameter values using, as a measurement condition of next measurement, the combination of the values of the parameters corresponding to a position designated by the user on the graph displayed by the display processor during the optimization of the device parameters.

(Clause 9) In the program for the mass spectrometer according to clause 7, the measurement control function unit may be configured to make measurements using, as a measurement condition of next measurement, the combination of the values of the parameters corresponding to a position designated by the user on the graph displayed by the display processing function unit during the optimization of the device parameters and the optimization-time parameter determination function unit may be configured to optimize parameter values based on a result acquired by the measurements.

According to the mass spectrometer in clause 3 and the program for the mass spectrometer in clause 9, for example, in a case where a user knows that a satisfactory measurement result can be acquired under a certain measurement condition as some prior information, parameter optimization can be done by preferentially setting such a measurement condition or setting such a measurement condition completely in response to an instruction from a user. This makes it possible to perform a parameter search that provides a more satisfactory measurement result.

(Clause 4) In the mass spectrometer in clause 1, the ion source may include an ion source using an electrospray ionization method, that is, an ESI ion source.

Even when the ESI ion source is compared with an ion source using another atmospheric pressure ionization method, it is complicated to optimize many parameters that affect ionization efficiency. Therefore, as for the mass spectrometer equipped with the ESI ion source, the effect of applying the mass spectrometer according to the present invention is particularly great.

(Clause 5) In the mass spectrometer in clause 4, the plurality of parameters included in the device parameters may include at least any one of a voltage for forming an electric field that applies a charge to the liquid sample nebulized in an approximately atmospheric pressure, a size of a droplet of a nebulized liquid sample, a flow rate of a gas for promoting vaporization of a solvent from the droplet, a temperature of the ionization chamber in which a gasification or ionization is performed, and a voltage for forming an electric field that leads an ion to an ion transport unit that transports the ion from a generation position of the ion to a next stage.

(Clause 6) More specifically, in the mass spectrometer in clause 5, the plurality of parameters may include at least one of a flow rate of an auxiliary nebulizing gas for nebulizing a droplet from a nozzle tip, a flow rate of a heating gas for promoting vaporization of the solvent in a nebulized droplet, a temperature of a heater for heating the heating gas, and a flow rate of a dry gas blown to the ions and the droplet near the ion transport unit into which the generated ions are introduced.

According to the mass spectrometer in clauses 5 and 6, in the mass spectrometer equipped with the ESI ion source, it is possible to create a measurement method capable of setting a parameter that has a relatively great influence on ionization efficiency to an optimal state or an approximately optimal state, and of detecting a target compound with high sensitivity.

REFERENCE SIGNS LIST

1 . . . Measurement Unit
2 . . . Liquid Chromatograph Unit
21 . . . Liquid Feeding Pump
22 . . . Injector
23 . . . Column
3 . . . Mass Spectrometry Unit
31 . . . Ion Source
310 . . . Chamber
311 . . . Ionization Chamber
312 . . . ESI Probe
3121 . . . Capillary
3122 . . . Nebulizing Gas Tube
3123 . . . Heating Gas Tube
3124 . . . Interface Heater
3125 . . . High-Voltage Power Source
313 . . . Desolvation Tube
314 . . . Dry Gas Tube
315 . . . Desolvation Tube Heater
316 . . . Block Heater
32 . . . Mass Separator
33 . . . Detector
4 . . . Controller
41 . . . Parameter Optimization-Time Measurement Controller
42 . . . Normal Measurement Controller
43 . . . Measurement Method Storage Unit
5 . . . Data Processor
51 . . . Peak Strength Calculator
52 . . . Data Storage Unit
53 . . . Parameter Optimization Processor
531 . . . Reference Model Storage Unit
532 . . . Posterior Distribution Model Estimator
533 . . . Next Search Parameter Determiner 534 . . . Search Termination Determiner
535 . . . Method Creation Unit
536 . . . Optimization-Time Display Processor
6 . . . Input Unit
7 . . . Display Unit

The invention claimed is:

1. A mass spectrometer including an ion source using an atmospheric pressure ionization method for ionizing a component contained in a liquid sample, a mass separator configured to separate ions derived from the sample component in accordance with a mass-to-charge ratio and a detector configured to detect separated ions, the mass spectrometer further comprising:
a parameter optimization unit configured to optimize values for device parameters including a plurality of parameters that affects ionization efficiency in the ion source using a Bayesian optimization method, based on a result acquired by making measurements while changing the values of the device parameters;
a display processor configured to display a sensitivity model which is a posterior distribution indicating a relationship between a plurality of parameters in all or some of the device parameters and signal strength estimated during the optimization of the device parameters by the parameter optimization unit, expressing as a graph like a heat map or an array of a plurality of the graphs on a display, and to sequentially update the sensitivity model; and
a file creation unit configured to allow a user to designate a position on the graph displayed by the display processor and to create a method file containing a measurement condition used for sample measurement, based on a combination of values of parameters corresponding to the designated position.

2. The mass spectrometer according to claim 1, further comprising a cancel instruction acceptance unit configured to allow the user to give an instruction for cancelling the optimization of the device parameters in the parameter optimization unit during the optimization,
wherein the parameter optimization unit is configured to cancel the optimization of the device parameters in response to acceptance of the cancel instruction from the cancel instruction acceptance unit.

3. The mass spectrometer according to claim 1, wherein the parameter optimization unit is configured to optimize parameter values using, as a measurement condition of next measurement, the combination of the values of the parameters corresponding to a position designated by the user on the graph displayed by the display processor during the optimization of the device parameters.

4. The mass spectrometer according to claim 1, wherein the ion source includes an ion source using an electrospray ionization method.

5. The mass spectrometer according to claim 4, wherein the plurality of parameters included in the device parameters includes at least one of a voltage for forming an electric field that applies a charge to the liquid sample nebulized in an approximately atmospheric pressure, a size of a droplet of a nebulized liquid sample, a flow rate of a gas for promoting vaporization of a solvent from the droplet, a temperature of an ionization chamber in which a gasification or ionization is performed, and a voltage for forming an electric field that leads an ion to an ion transport unit that transports the ion from a generation position of the ion to a next stage.

6. The mass spectrometer according to claim 5, wherein the plurality of parameters includes at least one of a flow rate of an auxiliary nebulizing gas for nebulizing a droplet from a nozzle tip, a flow rate of a heating gas for promoting vaporization of the solvent in a nebulized droplet, a temperature of a heater for heating the heating gas, and a flow rate of a dry gas blown to the ions and the droplet near the ion transport unit into which generated ions are introduced.

7. A non-transitory computer readable medium storing a program for a mass spectrometer, the mass spectrometer including an ion source using an atmospheric pressure ionization method for ionizing a component contained in a liquid sample, a mass separator configured to separate ions derived from the sample component in accordance with a mass-to-charge ratio, and a detector configured to detect the separated ions, the program configured to optimize parameter values of device parameters including a plurality of parameters that affect ionization efficiency in the ion source, the program causing a computer to operate as:
a measurement control function unit configured to control operations of the ion source, the mass separator, and the detector and to make measurements with values of device parameters determined by the optimization-time parameter determination function unit;
an optimization-time parameter determination function unit configured to optimize parameter values based on a result acquired by the measurements made under control of the measurement control function unit using a Bayesian optimization method and to determine values of the device parameters in next measurement;
a display processing function unit configured to display a sensitivity model which is a posterior distribution indicating a relationship between a plurality of parameters in all or some of the device parameters and signal strength estimated during the optimization of the device parameters in the measurement control function unit and the optimization-time parameter determination function unit, expressing as a graph like a heat map or an array of a plurality of the graphs on a display unit, and to sequentially update the sensitivity model; and
a file creation function unit configured to allow a user to designate a position on the graph displayed on the display unit and to create a method file containing a measurement condition used in sample measurement, based on a combination of values of parameters corresponding to the designated position.

8. The non-transitory computer readable medium according to claim 7, further comprising a cancel instruction acceptance function unit configured to allow the user to give an instruction for cancelling the optimization of the device parameters in the optimization-time parameter determination function unit during the optimization,
wherein the optimization-time parameter determination function unit is configured to cancel the optimization of the device parameters in response to acceptance of the cancel instruction by the cancel instruction acceptance function unit.

9. The non-transitory computer readable medium according to claim 7, wherein the measurement control function unit is configured to make measurements using, as a measurement condition of next measurement, the combination of the values of the parameters corresponding to a position designated by the user on the graph displayed by the display processing function unit during the optimization of the device parameters and the optimization-time parameter determination function unit is configured to optimize parameter values based on a result acquired by the measurements.

* * * * *